United States Patent [19]
Everett et al.

[11] Patent Number: 5,491,468
[45] Date of Patent: Feb. 13, 1996

[54] IDENTIFICATION SYSTEM AND METHOD WITH PASSIVE TAG

[75] Inventors: David F. Everett, Gambrills; John W. Frech, Baltimore; Theodore Wright, Crownsville; Kelly M. Rodriquez, Columbia, all of Md.

[73] Assignee: Westinghouse Electric Corporation, Pittsburgh, Pa.

[21] Appl. No.: 80,843

[22] Filed: Jun. 24, 1993

[51] Int. Cl.$^6$ .................................................. G08B 21/00
[52] U.S. Cl. .............. 340/572; 340/825.54; 340/870.31; 435/91
[58] Field of Search .............................. 340/572, 825.54, 340/870.31; 455/41; 235/380, 383, 385; 343/44, 51

[56] References Cited

U.S. PATENT DOCUMENTS

| | | | |
|---|---|---|---|
| 5,019,815 | 5/1991 | Cemelson | 340/572 |
| 5,053,774 | 10/1991 | Schuermann et al. | 342/44 |
| 5,099,226 | 3/1992 | Andrews | 340/572 |
| 5,105,190 | 4/1992 | Kip | 340/572 |
| 5,124,699 | 6/1992 | Tervoert | 340/572 |
| 5,218,343 | 6/1993 | Stobbe | 340/572 |
| 5,235,326 | 8/1993 | Beigel | 340/572 |
| 5,266,926 | 11/1993 | Beigel | 340/572 |
| 5,353,011 | 10/1994 | Wheeler | 340/572 |

*Primary Examiner*—Brent A. Swarthout
*Assistant Examiner*—Albert K. Wong

[57] ABSTRACT

An identification system with a reading device having a single turn transmission coil for continuously radiating alternating energy. A portable tag receives via a magnetic coupling, the energy from the reader and charges a storage capacitor to 5 volts. The capacitor is discharged rapidly during a time period less than the charging time period. This discharge of the capacitor powers a coded information transmission circuit during a small percentage of the duty cycle.

17 Claims, 4 Drawing Sheets

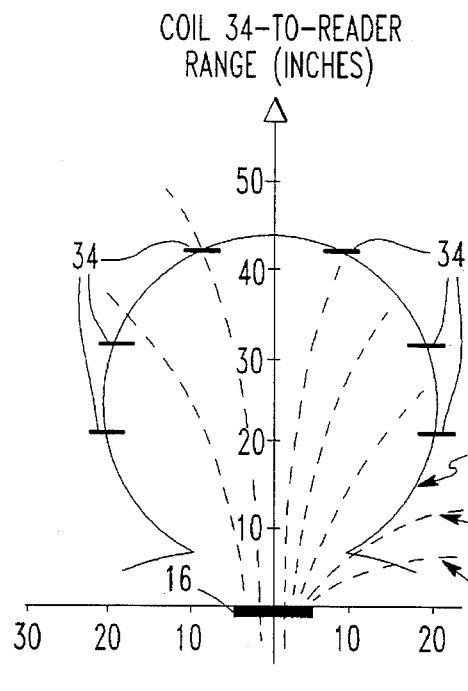
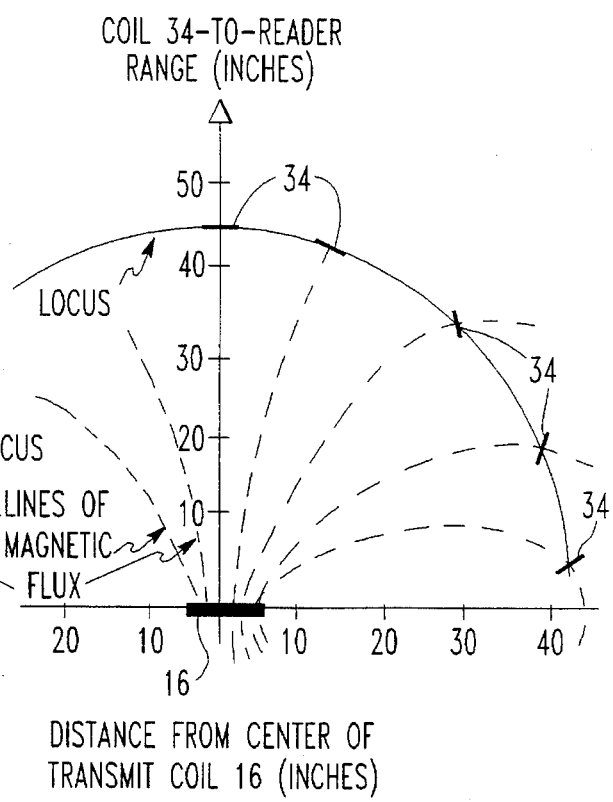
FIG.4A
FIG.4B
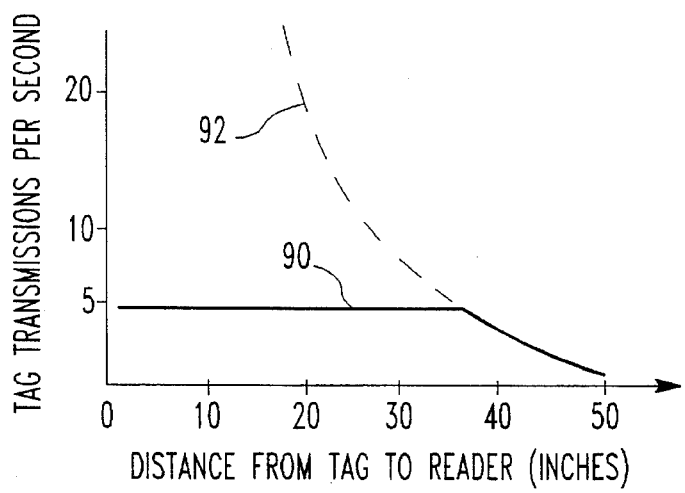
FIG.5

IDENTIFICATION SYSTEM AND METHOD WITH PASSIVE TAG

BACKGROUND OF THE INVENTION

1. Field of the Invention

The present invention relates to an identification system utilizing a portable passive tag which is powered by and communicates with a stationary reading device. More particularly, the present invention relates to an identification system and method in which the portable tag communicates with the reading device by magnetic coupling.

2. Description of Related Art

Portable passive security tag systems have been proposed that use magnetic coupling for energy transfer from a stationary power source to a credit card size portable uniquely coded security tag.

In such systems, a transmit coil of a reader creates a magnetic field which alternates at a frequency, typically below 200 KHz. The magnetic field of the transmit coil induces current flow in a portable tag and thereby produces a voltage. The portable tag rectifies the voltage to provide a voltage sufficient to power an application specific integrated circuit (ASIC) which is part of the tag. When the tag and the reading device (also referred to as a reader) are close enough to effect the transfer of energy, the tag ASIC generates a coded signal that is transmitted to the reader via a magnetic coupling.

In systems of this type, for many applications, it is desirable to be able to magnetically couple a tag to a reader at a considerable distance and with different relative orientations. Prior to the present invention it was necessary to increase the transmit power of the reader in order to increase the effective range between the reader and the tag. Any increase in a transmit power level involves cost, reliability, and safety considerations. Also, radiated power levels are limited by regulation, which in turn limits the magnetic coupling range which can be achieved.

For certain applications, it is desirable for a reader to identify several portable tags simultaneously. However, real time transmission from a plurality of tags to the reader as in previous systems, resulted at times in interference between tags.

In light of the foregoing, there is a need for a method and system of powering a portable tag for transmitting coded information to a reader that overcomes one or more of the disadvantages of prior arrangements.

SUMMARY OF THE INVENTION

Accordingly, the present invention is directed to a method and system for powering a portable tag of an identification system of the type adapted to transfer energy by magnetic coupling that overcomes one or more of the disadvantages of prior arrangements.

To achieve these and other advantages, and in accordance with the purpose of the present invention, as embodied and broadly described, the invention is a method of communicating coded information from a passive portable tag to a reading device of an identification system wherein the reading device and the portable tag each have a coil for transferring energy therebetween, comprising the steps of generating in the coil of the reading device alternating energy having a predetermined frequency and amplitude; receiving in the magnetic coil of the portable tag the generated energy of the reading device at times when the reading device and the portable tag are magnetically coupled; storing in the portable tag the received generated energy throughout a first time period; releasing the stored energy during a second time period having a duration less than said first time period; and using the released energy to transmit the coded information to the reading device from the portable tag during the second time period while the reader and tag are magnetically coupled.

In another respect, the invention is an identification system, comprising a reading device for receiving coded information via a magnetic coupling and for radiating a magnetic field, the reading device including a first conductive coil, and a transmission circuit coupled to the first conductive coil for creating in the coil an alternating magnetic field having a predetermined frequency. The system also has a portable tag for transmitting the coded information via the magnetic coupling in response to the reception of the alternating magnetic field radiated by the first conductive coil of the reading device. The portable tag includes a second conductive coil for collecting energy from the radiated magnetic field, a reception circuit including a storage capacitor electrically coupled to the second conductive coil and responsive to the collected energy for charging the storage capacitor throughout a first time duration. The reception circuit includes a power up circuit electrically coupled to the storage capacitor for discharging the capacitor during a second time duration less than the first time duration; and a coded information transmission circuit electrically coupled to the magnetic coupling and the reception circuit and responsive to the discharging of the storage capacitor for transferring the coded information to the reading device during the second time duration.

It is to be understood that both the foregoing general description and the following detailed description are exemplary and explanatory, and are intended to provide further explanation of the invention as claimed.

The accompanying drawings are included to provide a further understanding of the invention and are incorporated in and constitute a part of this specification, illustrate one embodiment of the invention, and together with the description serve to explain the principles of the invention.

BRIEF DESCRIPTION OF THE DRAWINGS

FIG. 4A, and 4B, are schematic diagrams illustrating flux linkages for relative orientations of the transmit and receive coil of the reader and tag respectively; and FIG. 5 is a graph illustrating the effect of the time-out circuit of the reception circuitry for various ranges.

DETAILED DESCRIPTION OF THE PREFERRED EMBODIMENT

Figure 1:
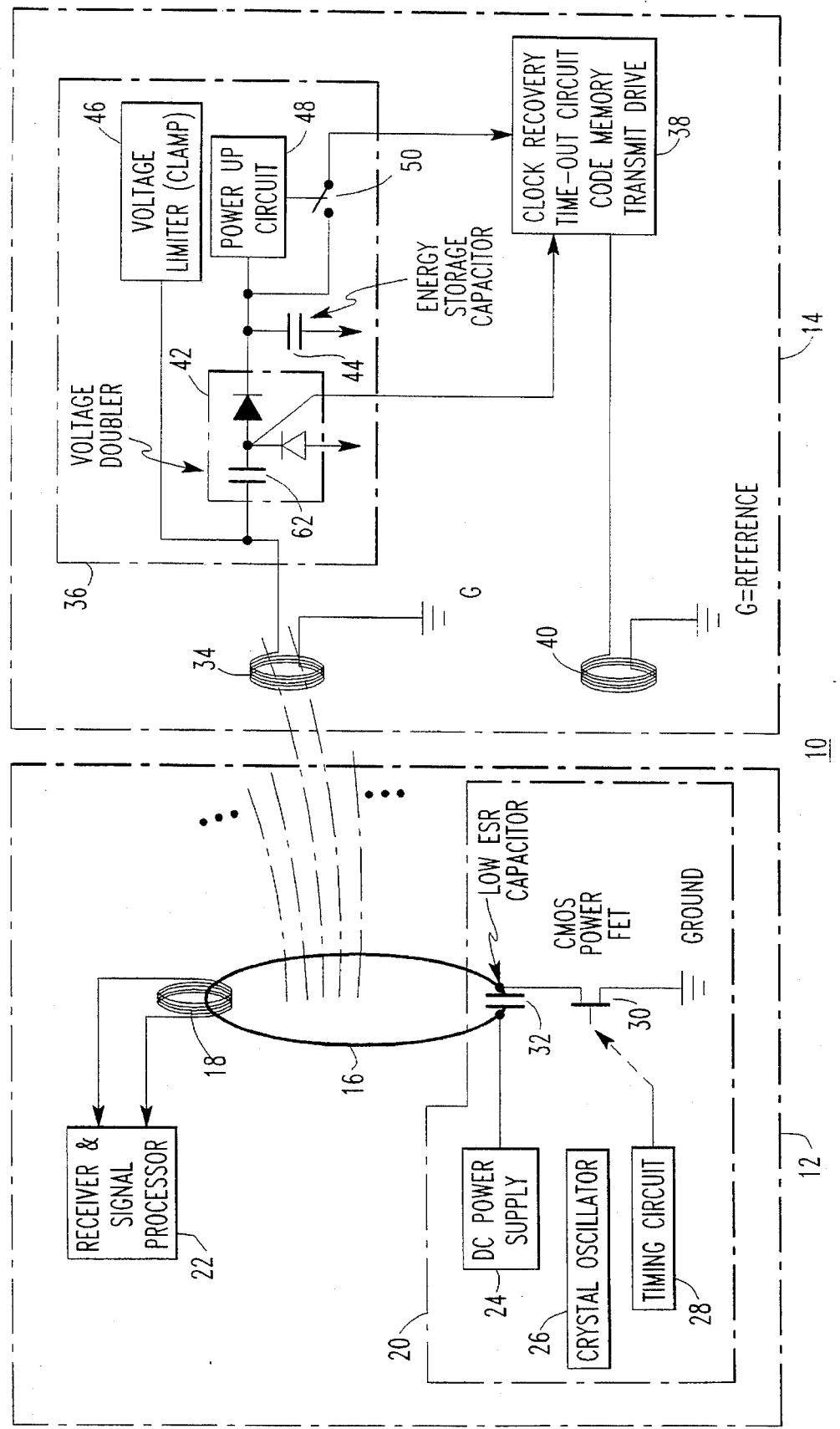
FIG. 1 is a schematic diagram illustrating the organization and components of the identification system in accordance with one embodiment of the invention.

Reference will now be made in detail to the present preferred embodiment of the invention, an example of which is illustrated in the accompanying drawings.

An identification system generally referred to as 10 is made up of a reading device 12 and any number of portable tags 14. The reading device 12 of the present invention has a transmit coil 16 and a receive coil 18. The transmit coil 16 is coupled to a transmission circuit contained within the dashed lines referred to at 20. Coupled to coil 18 is a receiver and signal processor 22. The transmission circuit 20 has a DC power supply 24, a crystal oscillator 26, a timing circuit 28, a field effect transistor switch 30, and a capacitor 32. The transmit coil 16 and capacitor 32 constitutes a tank circuit.

The portable tag 14 of the present invention has an energy receive coil 34, a reception circuit 36, a plurality of ASIC circuits 38, and a transmit coil 40. The reception circuit 36 has a voltage doubler 42, a storage capacitor 44, a voltage limiter circuit 46, a power up circuit 48 and a switch 50. The ASIC circuit 38 includes a clock recovery circuit, a time-out circuit, a code memory, and a transmit drive.

The transmit coil 16 of the present invention is preferably a single annulus of an elongated conductor with very low resistance. In one implementation, the coil is a bar of copper of rectangular cross-section which is approximately one quarter of an inch in width. However, the coil 16 may also be of other geometric configurations such as circular or elliptical or made of very heavy gauge wire that is approximately one-quarter inch in diameter. The coil 16 is tuned to a transmit frequency of 140 kilohertz by the capacitor 32 which has a low equivalent series resistance (ESR). The tuned circuit which includes the coil 16 and the capacitor 32 is a tank circuit that has a high "Q" because of the low resistance of the coil. Therefore, large coil currents can circulate through the coil producing a strong magnetic field. The single turn coil, rather than a coil with multiple turns, has the advantage of producing the strongest magnetic field for a given DC power supply voltage. This occurs because the fewer the turns that an inductor has, the smaller the inductance. The smaller the inductance, the larger the capacitor is needed to resonate with the inductor.

Figures 3, 3A:
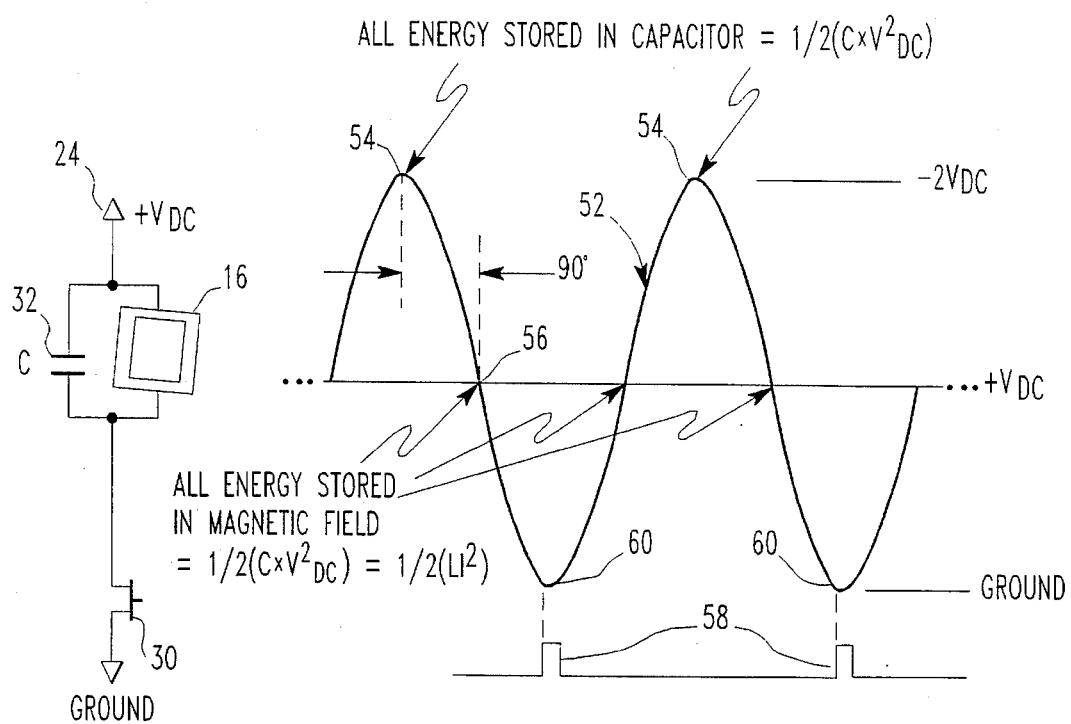
FIG. 3 is a graph illustrating individual cycles of the transmit waveform of FIG. 2 and impulse timing of the reader in accordance with principles of the present invention.
FIG. 3A illustrates the circuit producing the waveform of FIG. 3.

Referring to FIG. 3, waveform 52 represents the alternating voltage across the coil 16. The energy stored in the capacitor 32 is maximum at peaks 54 of the waveform 52. The peaks are equal to the voltage of the DC power supply 24. Therefore, for a given DC supply the energy stored in a capacitor is largest for the largest capacitor value. 90° later at point 56, the voltage on the capacitor 32 is zero. All the energy that was stored in the capacitor 32 is now stored in the magnetic field. Thus, the magnetic field radiated by the coil 16 is maximized for a given DC supply voltage by using a single turn coil. The field strength of the coil 16 depends on its radius. Depending on the application of the system, the coil size is preferably kept to a reasonable size in order to be commercially attractive. In one implementation, the coil has an equivalent coil radius of approximately 5 inches. Preferably, the coil is rectangular because it fits efficiently in a typical rectangular reader housing. Such a rectangular coil 16 is shown (schematically) in FIG. 3A.

The field effect transistor switch 30 provides an impulse 58 to the waveform at peaks 60 of FIG. 3 during each cycle of the waveform 52. These impulses 58 replace the energy dissipated each cycle primarily by the resistance in the tank circuit that includes the capacitor 32 and the coil 16. Some energy loss, of course, is a desired loss, which is the energy transferred to the tag. Some energy is lost to the equivalent radiation resistance, which is minimal at this frequency. Some energy is lost to resistance in the conductive materials in the vicinity of the reader 12 due to eddy currents induced by the alternating magnetic field. In the embodiment described, the tank circuit has been measured to have a Q of approximately 60. This is determined by the following equation:

$$Q = 2\pi * 140 \text{ KHz} * \text{(energy stored)}/\text{(average power loss)} = 60.$$

The crystal oscillator 26 provides a stable frequency reference for the system and controls the timing of the FET switch 30. The FET switch duty factor is approximately 5% and is timed to open close to the peaks 60 of the waveform 52.

In accordance with the present invention, a portable tag includes a reception circuit that has a storage capacitor electrically coupled to the conductive receiving coil of the tag and is responsive to the collected energy for charging the storage capacitor throughout a first time duration. In accordance with the invention, the reception circuit includes a power circuit electrically coupled to a storage capacitor for discharging the capacitor during a second time duration less than the first time duration.

As herein embodied, and again referring to FIG. 1, the energy receive coil 34 of the tag is preferably a coil with an approximately 600 turns of number 40 wire which is self resonant at about 140 KHz. The coil 34 preferably has an outside diameter of 1.5 inches and is about 1/64 of an inch thick in the axial direction. The Q of the tank circuit of the tag which is defined by the coil 34 and a coupling capacitor 62 is about 30. Coils made according to the above measurements have shown to consistently tune at the same frequency, and therefore need no manual tuning. The reception circuit 36 and the ASIC circuit 38 which are coupled to the output of the coil 34 all preferably have a high input impedance during time 74 of FIG. 2 greater than 30 megohms, for example.

The voltage doubler 42 serves to boost the voltage of the coil. A value of the coupling capacitor 62 is preferably about 10 Picofarads (PF) which has been determined to provide a fast charging time to the energy storage capacitor 44 which has a value of 0.3 Microfarad (UP). As herein embodied, the power up circuit 48 detects the voltage in the storage capacitor 44. When the voltage exceeds 5 volts for example, the circuit connects the capacitor 44 to the rest of the ASIC by closing the switch 50. In response to the connection of the capacitor discharge to the ASIC circuits, the circuits 38 start draining the charge from the storage capacitor 44. Also, the power up circuit operates so that the charge on the capacitor 44 will continue to drain until it reaches approximately 3 volts. This insures that the circuits 38 remain powered until the tag has completed its transmission of the coded information.

The voltage limiter circuit 46 serves to limit the maximum voltage to which the storage capacitor 44 will charge. This is desirable when a tag is placed in extremely close proximity to the reader.

Of the ASIC circuit 38, a clock recovery circuit conditions the 140 KHz energy to be suitable for clocking the digital circuits of the ASIC. A time-out circuit limits how often the tag can transmit via coil 40 of the tag. Without this time-out circuit, a tag at close range could transmit often enough to deny a tag at farther range the attention of the reader. The average time-out between transmissions to the reader is approximately 250 milliseconds. Because tags are not exactly the same as one another and because they are not exactly at the same orientation or distance from the reader, their respective storage capacitors will not recharge at exactly the same rate. That is, two tags are very unlikely to transmit simultaneously on consecutive tag transmissions with a short duty cycle. Another option to further reduce the likelihood of two tags transmitting simultaneously is to provide a time-out that depends upon the unique code of each tag.

When the ASIC circuits are powered up, the code is transmitted by way of the tag transmit coil 40. The tag transmit coil 40 has about 400 turns of number 40 wire and is tuned at 70 KHz for transmission to the coil 18 of the reader 12. The difference between the energy receive frequency of the tag via coil 34 and energy transmit frequency in the coil 40 permits both the reader and tag to distinguish between reader transmissions and tag transmissions. The transmit coil 40 is similar in size to the receive coil 34 and fits on a credit card size tag alongside of the tag energy receiving coil 34. Similar to the field strength considerations of the coil 16, the lower the inductance of the tag transmit coil 40, the stronger the tag transmit magnetic field and the faster the discharge of the tag storage capacitor 44.

The receive coil 18 of the reader is a multiple turn coil that is tuned to 70 KHz similar to the transmit coil 40 of the tag. The output of coil 18 is applied to the receiver and signal processor 22 for processing the coded information.

Figure 2:
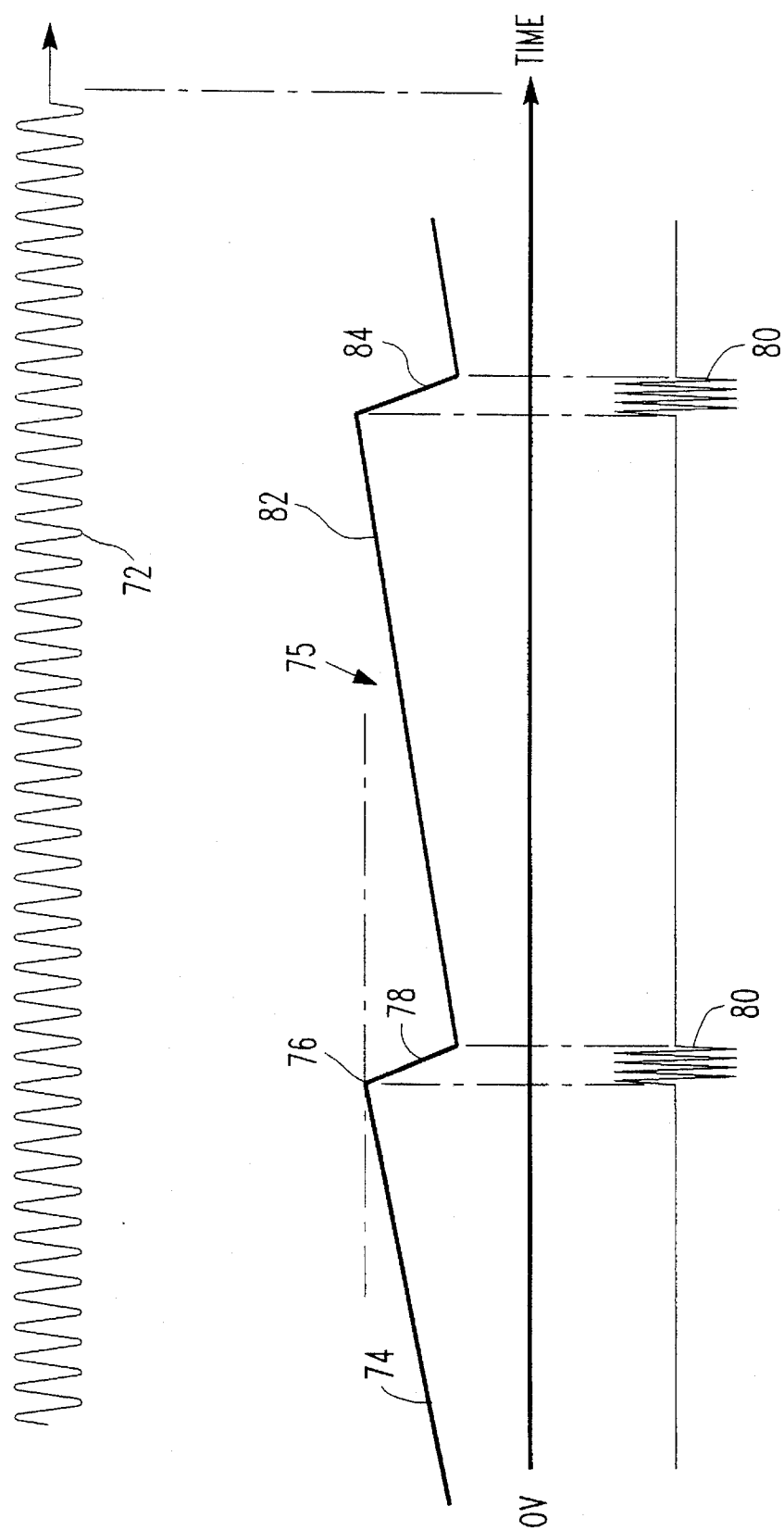
FIG. 2 is a graphical representation of the energy waveform radiated by the transmit coil of the reading device and the waveform radiated by the transmit coil of a portable tag in accordance with principles of the present invention.

The operation and method of the system of the present invention will now be described in more detail in connection with FIG. 2. The coil 16 of the reader which is preferably offset from the reader receive coil 18 continuously radiates alternating current energy as shown by waveform 72. The waveform 72 is continuous at the same frequency of approximately 140 KHz and amplitude of 2 times+Vdc volts peak-to-peak. When a portable tag 14 is placed in proximity to the reader 12 at a distance where the coils 16 and 18 are magnetically coupled with the coils 34 and 40 of the tag 14, respectively, the energy represented by waveform 72 is also being continuously received by the coil 34. However, while being received, the capacitor 44 is being charged throughout a first time duration as represented by an ascending portion 74 of waveform 75. When the capacitor 44 is charged to a power up threshold indicated at 76, which is approximately 5 volts, for example, the power up circuit causes the capacitor 44 to discharge during a second time duration as indicated by the descending portion 78 of the waveform 75. This discharge causes a coded information signal having a frequency corresponding to one half of the received frequency or 70 KHz, to be radiated by the coil 40 of the tag to be received by coil 18 of the reader 12 for processing by the processor 22. The information occurs in short bursts 80 that correspond to the discharge time 78 of the capacitor 44 which is substantially shorter than the buildup time during the storage of the received energy represented by portion 74 of waveform 75. Since the tag 14 is receiving the energy 72 as long as it is magnetically coupled to the reader 12, the capacitor 44 will again charge to the required voltage over a period of time corresponding to a second ascending portion 82 and again discharge at time 84 to again transmit a short burst of energy information 80 at a frequency of 70 kilohertz. The time between each of the bursts of coded information 80 is controlled by the time-out circuit of the ASIC 38 as previously mentioned. Thus, as shown in FIG. 2 the energy is received by the tag over a long period of time and is transmitted in short periods of time or in other words the information transmitted to the reader has a short duty cycle. Thus, a plurality of tags may be magnetically coupled to the same reader simultaneously and are able to transmit the coded information in time intervals between the bursts 80 of another tag.

Referring to FIG. 4A, when the receive coil 34 is held parallel to the reader transmit coil 16, the tag receive coil 34 will receive equal energy per unit of time for charging the capacitor at the locus of points in space throughout a practically complete 360° locus of points. On the other hand and referring to FIG. 4B, the locus of points for receiving equal energy per unit of time is optimized when the tag receive coil 34 is oriented at an angle to obtain the most flux linkage.

Referring to FIG. 5, the abscissa of the graph indicates the distance from the tag to the reader in inches and the ordinate of the graph indicates the number of tag transmissions per second. The solid line 90 represents the number of transmissions per second along a line from zero to almost 40 inches from the reader. At approximately 35 to 40 inches from the reader, the number of tag transmissions per second drops off substantially. Without the time-out circuit, as the tag gets closer to the reader the number of tag transmissions per second will increase as shown by dashed line 92. This graph was prepared for short transmission bursts of approximately 6 milliseconds. The same number of transmissions per second will occur anywhere along the locust in FIGS. 4A and 4B. With the time-out circuit portion of ASIC 38 in operation, the number of transmissions per second by the tag is limited to approximately four. This results in a tag transmit duty cycle of about 2½%. Therefore all tags in the vicinity of the reader which are magnetically coupled thereto have a high probability of being read by the reader in a short period of time.

In summary, there has been described a system and method for increasing the range for magnetic coupling between a reading device and a portable tag without increasing the transmit power of the reading device. This is accomplished by limiting the tag transmission duty factor of the tag to a small value such as 1% at maximum range. In other words, energy radiated from the reading device is accumulated on a storage device in the tag such as a storage capacitor, over a long period of time and released as a tag transmission in a short period of time. At ranges less than maximum, the energy buildup is faster and the tag duty factor can increase. By doing this, the transmit power of the tag can actually be greater than the power received by the tag.

For example, the tag receives energy continuously and transmits for approximately 6 milliseconds every 600 milliseconds at maximum range. Thus, the transmit power of the tag can be up to 100 times more than the power received from the reading device. Assume that only half of the energy received by the tag is available for retransmitting by the tag to the receiving device of the reader. If the energy per unit of time received by the tag is 10 microwatts, the tag transmitting power is (10 microwatts*0.5 seconds)/2/0.005 seconds=500 microwatts. This is a power gain of 17 dB. Also, the relatively short transmit time allows multiple tags to operate simultaneously since each tag transmits for only a small fraction of time, the probability that two tags will transmit simultaneously is small. By tying the trigger for the tag to transmit to the amount of energy stored in the tag, each tag will operate at a different duty factor, since each tag will receive a different power level based on its location relative to the reader. Thus, even if two tags transmit simultaneously once, they will transmit at different times the next time each transmits. After several cycles, the reading device will correctly receive data from all tags present.

It will be apparent to those skilled in the art that various modifications and variations can be made in the system and method of the present invention without departing from the scope or spirit of the invention. Thus, it is intended that the present invention cover the modifications and variations of this invention provided they come within the scope of the appended claims and their equivalents.

What is claimed is:

1. An identification system, comprising
   a reading device including means for receiving and processing coded information received via a magnetic coupling from at least one portable tag and for radiating a continuous wave alternating magnetic field, the reading device including
      a first conductive coil,
      a transmission circuit coupled to the first conductive coil for generating the continuous wave alternating magnetic field of a predetermined frequency; and
   at least one portable tag for transmitting the coded information via the magnetic coupling in response to the reception of the continuous wave alternating magnetic field radiated by the reading device, each portable tag including
      means for storing the coded information to be transmitted,
      a second conductive coil for receiving and collecting energy of the radiated magnetic field,
      a reception circuit including a storage capacitor electrically coupled to the second conductive coil for charging the storage capacitor throughout a first time duration,
      the reception circuit including a circuit switch electrically coupled to the storage capacitor for discharging the capacitor after the charge on the capacitor has attained a predetermined threshold level, the discharging occurring during a second time duration less than the first time duration, said circuit switch being activated in direct response to the voltage across the capacitor having attained the predetermined threshold level and independent of the amplitude of the received radiated magnetic field, and
      coded information transmission means responsive to the activation of the switch, allowing discharging of the storage capacitor, and operable to transmit the stored coded information to the reading device by means of the magnetic coupling, during the second time duration.

2. The identification system of claim 1 wherein the first conductive coil comprises a single turn of an elongated conductor having a dimension in cross-section of approximately one quarter of an inch.

3. The identification system of claim 2 wherein the transmission circuit includes a capacitor with a low equivalent series resistance to define a tank circuit with the first conductive coil having a high Q and tuned to the predetermined frequency.

4. The identification system of claim 1 wherein the transmission circuit comprises a switching transistor responsive to the frequency of a timing circuit driven by a crystal oscillator for applying a periodic voltage impulse during successive cycles of the tuned frequency.

5. The identification system of claim 1 wherein the second conductive coil comprises wire having approximately 600 turns and has an outside diameter of approximately one and one-half inches and an annulus with a thickness in the axial direction of approximately one sixty-fourth of an inch.

6. The identification system of claim 1 wherein the reception circuit comprises a coupling capacitor connected to the second coil of approximately ten picofarads.

7. The identification system of claim 1 wherein the reception circuit comprises a storage capacitor connected to the second coil of approximately three tenths of a microfarad.

8. The identification system of claim 1 wherein the reception circuit comprises a voltage doubler for boosting the voltage of the second coil.

9. The identification system of claim 1 wherein the reception circuit includes a power circuit for discharging the storage capacitor at times when the storage capacitor is charged to a predetermined voltage.

10. The identification system of claim 1 wherein the reception circuit includes a power circuit for discharging the storage capacitor at times when the storage capacitor is charged to a first predetermined voltage and for disconnecting the storage capacitor from the coded information transmission circuit at times when the capacitor discharges to a second predetermined voltage less than the first predetermined voltage.

11. A method of communicating coded information from a passive portable tag to a reading device of an identification system wherein the reading device continuous wave alternating energy having a predetermined frequency and amplitude;
   receiving via the magnetic coupling of the portable tag the generated energy of the reading device at times when the reading device and the portable tag are magnetically coupled;
   storing in the portable tag the received generated energy during a first time period;
   releasing the stored energy as soon as it has reached a predetermined value, during a second time period having a duration less than said first time period; and
   using the released energy to transmit the coded information via the magnetic coupling of the portable tag during the second time period.

12. The method claim 11 wherein the step of storing in the portable tag, comprises the substep of charging a capacitor to a predetermined voltage.

13. The method of claim 11 wherein the step of releasing the stored energy comprises the substep of discharging a capacitor to a first predetermined voltage in response to the charging of the capacitor to a second predetermined voltage higher than the first predetermined voltage.

14. The method of claim 11 further comprising the step of setting a minimum time interval between each transmission of coded information.

15. The identification system of claim 1 wherein the reception circuit comprises a time-out circuit for controlling time intervals between successive transmissions by the coded information transmission circuit.

16. A passive portable tag for an identification system having a reading device for supplying a continuous wave alternating magnetic field to the tag and for receiving information from the tag, when magnetically coupled to the tag, the tag comprising
   a receiving coil for receiving the continuous wave alternating magnetic field from the reading device,
   a storage capacitor electrically connected to the receiving coil to be charged throughout a first time period to a predetermined voltage,
   a first circuit means responsive to the charged capacitor attaining a predetermined voltage level, to discharge the capacitor, and
   a second circuit means responsive to the discharging of the capacitor for transmitting the information during a second time period shorter than the first time period, the first circuit means being operable in direct response to the voltage across the capacitor having attained the predetermined voltage level and independent of the amplitude of the received continuous wave magnetic field.

17. The system of claim 1 wherein the switch circuit controls the discharging of the storage device at spaced time intervals, each said spaced time interval being substantially greater than each second time duration to permit reception of coded information from other tags during each said spaced time period.

* * * * *